(12) United States Patent
Gao et al.

(10) Patent No.: US 10,776,681 B2
(45) Date of Patent: Sep. 15, 2020

(54) TRANSACTION CARD WITH 3D PRINTING GRAPHIC SURFACE

(71) Applicant: GIESECKE+DEVRIENT MOBILE SECURITY GMBH, München (DE)

(72) Inventors: Junjie Gao, Huangshi (CN); Chen Fang, Huangshi (CN); Teng Zeng, Huangshi (CN)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/774,048

(22) PCT Filed: Oct. 25, 2016

(86) PCT No.: PCT/EP2016/001771
§ 371 (c)(1),
(2) Date: May 7, 2018

(87) PCT Pub. No.: WO2017/076489
PCT Pub. Date: May 11, 2017

(65) Prior Publication Data
US 2018/0330214 A1  Nov. 15, 2018

(30) Foreign Application Priority Data
Nov. 6, 2015 (CN) .................... 2015 2 0879638 U

(51) Int. Cl.
*G06K 19/06* (2006.01)
*B42D 25/324* (2014.01)
*G05B 19/4099* (2006.01)

(52) U.S. Cl.
CPC ..... *G06K 19/06196* (2013.01); *B42D 25/324* (2014.10); *G05B 19/4099* (2013.01); *G05B 2219/49023* (2013.01)

(58) Field of Classification Search
CPC ... G06K 19/00; G06K 19/06; G06K 19/06187
(Continued)

(56) References Cited

U.S. PATENT DOCUMENTS

| 7,544,266 B2 | 6/2009 | Herring et al. |
| 9,327,484 B2 | 5/2016 | Herring et al. |

(Continued)

FOREIGN PATENT DOCUMENTS

| CN | 204155303 U | 2/2001 |
| CN | 2743904 Y | 11/2005 |

(Continued)

OTHER PUBLICATIONS

International Search Report from PCT Application No. PCT/EP2016/001771, dated Mar. 1, 2017.
(Continued)

*Primary Examiner* — Daniel St Cyr
(74) *Attorney, Agent, or Firm* — Workman Nydegger

(57) ABSTRACT

A transaction card has a 3D printing graphic surface and a card base. The card base comprises in order from top to bottom: a front protective film layer, a front substrate layer, an intermediate INLAY layer, a back substrate layer, a back printing graphic layer, and a back protective film layer. The upper surface of the front protective film layer is adhered with a 3D printing graphic layer with a height of 0.05-0.46 mm. The transaction card is uniquely designed with a 3D printing graphic effect incorporated in the card surfaces, therefore the overall quality of the card is improved, allowing the transaction card to be widely used in financial, transport, social security, medical care, schools, security service and other fields.

7 Claims, 2 Drawing Sheets

(58) Field of Classification Search
USPC .................................................. 235/493, 487
See application file for complete search history.

(56) References Cited

U.S. PATENT DOCUMENTS

| | | |
|---|---|---|
| 9,514,393 B2 | 12/2016 | Zheng et al. |
| 2005/0257880 A1 | 11/2005 | Herring et al. |
| 2009/0314424 A1 | 12/2009 | Herring et al. |
| 2014/0111816 A1 | 4/2014 | Zheng et al. |
| 2015/0088290 A1 | 3/2015 | Ghosh |
| 2018/0330201 A1 | 11/2018 | Gao et al. |

FOREIGN PATENT DOCUMENTS

| | | | |
|---|---|---|---|
| CN | 101084124 | A | 12/2007 |
| CN | 201082605 | Y | 7/2008 |
| CN | 201165095 | Y | 12/2008 |
| CN | 103144444 | A | 6/2013 |
| CN | 203260055 | U | 10/2013 |
| CN | 203520439 | U | 4/2014 |
| CN | 203520444 | U | 4/2014 |
| CN | 203631059 | U | 6/2014 |
| CN | 204155303 | U | 2/2015 |
| CN | 104463317 | A | 3/2015 |
| CN | 204557524 | U | 8/2015 |
| CN | 205139959 | U | 4/2016 |
| EP | 2161137 | A1 | 3/2010 |
| EP | 2650827 | A1 | 10/2013 |
| EP | 2857218 | A2 | 4/2015 |
| WO | 0169521 | A1 | 9/2001 |
| WO | 2009078810 | A1 | 6/2009 |
| WO | 2013000118 | A1 | 1/2013 |

OTHER PUBLICATIONS

Chinese Office Action from CN Application No. 201680065227.1 dated Apr. 25, 2019.
Chinese Evaluation Report of Patent from CN 201520879638 dated Jun. 6, 2017.

TRANSACTION CARD WITH 3D PRINTING GRAPHIC SURFACE

TECHNICAL FIELD

The present invention relates to the technical field of transaction cards, and specially a financial transaction card with 3D printing graphic surface.

BACKGROUND TECHNIQUES

In recent years, with the continuous development of financial transaction card technology, all kinds of dual-interface transaction cards have been widely used in the fields such as finance, medical care, public transport, security systems, telephonic communication, social security and so on. At present, the materials used for common financial transaction cards on the market are mostly plastic-based materials such as PVC, PC, ABS, etc. The structure of a general dual-interface transaction card has a card base comprising in order from top to bottom: a front protective film layer, a front silk printing/offset printing substrate layer, an intermediate INLAY layer, a back silk printing/offset printing substrate layer, back protective film layer, with graphic information printed on the front/back silk printing/offset printing substrate layer. With single appearance pattern, few card styles and poor hand-tactile experience, existing dual-interface cards are difficult to meet different needs of customers.

There are the following problems for general silk-screen printing/lithographic printing graphic cards: 1. Before printing graphic, silk-screen printing needs screen-stretching, while lithographic printing needs to make the PS version, therefore the preparatory work of these two printing graphics are relatively complex and complicated; 2. As for silk-screen printing/lithographic printing, the graphic is printed on the front/back printing layer, and front/back protective layers are added on the graphic surface after completing printing, thus the graphic is plane, hardly tactile, and the threedimensional effect of the graphic cannot be realized; 3. The current cards are with single appearance pattern and poor market competitiveness. Therefore, it is necessary to research and develop a new dual-interface card to improve the market competitiveness for enterprises and the market share of their products.

SUMMARY OF THE PRESENT INVENTION

Aiming at the problems of single appearance pattern, few card styles, poor hand-tactile experience and being difficult to meet customers' different needs of the existing general dual-interface transaction cards, the purpose of the present invention is to propose a transaction card with 3D printing graphic surface.

A transaction card, in particular a transaction card, with 3D printing graphic surface of the present invention has a card base, and said card base comprises in order from top to bottom: a front protective film layer, a front substrate layer, an intermediate INLAY layer, a back substrate layer, a back printing graphic layer, a back protective film layer, in particular: at least the upper surface of said front protective film layer is adhered with a 3D printing graphic layer with a height of 0.05-0.46 mm. As an alternative, the back protective film layer may be provided with a 3D printing graphic layer with a hight of 0.05-0.46 mm.

Of course in the present invention, a concave cavity accommodating the IC module can be formed in said card base, with the IC module encapsulated within the concave cavity to make the card into a contact transaction card.

In order to further expand the utilization scope of the transaction card of the present invention, a magnetic strip is adhered on the back protective film layer of said card base along the length direction.

In the present invention, the VGD610UV-MVP 3D printer with six-color UV ink of white, transparent, C, M, Y, K ink is employed to print said 3D printing graphic layer. Of course in the present invention, it is not limited to adopt the above-mentioned 3D printer to print the 3D printing graphic, but other printers produced by other companies suitable for printing card graphic surfaces can also be used to perform card production.

Of course, in the present invention, it is not limited to make the 3D printing graphic layer cover the entire front of the card body, and it is also possible that graphic information is printed on said front substrate layer while partial 3D graphic decorations are performed on the front protective film layer so as to meet different needs of different customers. The partial 3D graphic decoration on the front protective film layer and/or the back protective film layer may be in the shape of an object, a human being, an animal, etc. when viewed from above.

The transaction card of the present invention is uniquely designed with new 3D printing graphic effect incorporated in the card surfaces, therefore the overall quality of the card is improved, allowing the transaction card of the present invention to be widely used in financial, transport, social security, medical care, schools, Security service and other fields with broad market prospects and strong domestic and international competitiveness.

REFERENCE SIGN LIST

1—front protective film layer
2—front substrate layer
3—intermediate INLAY layer
4—back substrate layer
5—back printing graphic layer
6—back protective film layer
7—3D printing graphic layer
8—IC module
9—front printing graphic layer
10—magnetic strip

DETAILED DESCRIPTION OF THE EMBODIMENTS

Embodiment 1

Figure 1:
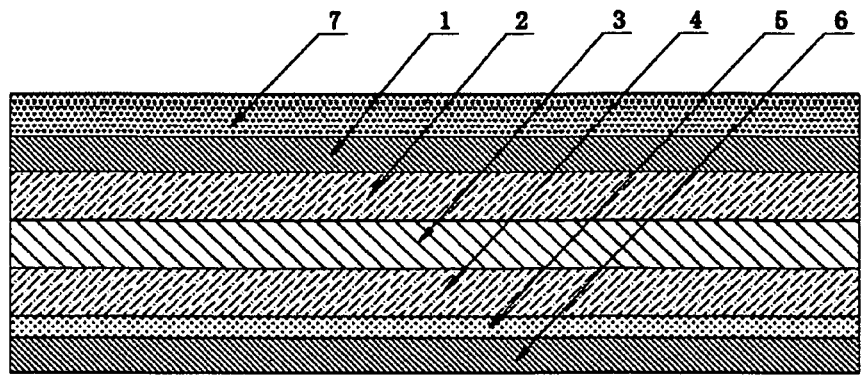
FIG. 1 is the structural schematic view of embodiment 1 of the present invention.

With reference to FIG. 1, a transaction card with 3D printing graphic surface has a card base, and said card base comprises in order from top to bottom: a front protective film layer 1, a front substrate layer 2, an intermediate INLAY layer 3, a back substrate layer 4, a back printing graphic layer 5, a back protective film layer 6, in particular: the upper surface of said front protective film layer 1 is adhered with a 3D printing graphic layer 7 with a height of 0.05-0.46 mm, and specifically in the present embodiment this height is 0.46 mm.

In the present embodiment, the VGD610UV-MVP 3D printer with six-color UV ink of white, transparent, C, M, Y, K ink is employed to print said 3D printing graphic layer.

Embodiment 2

Figure 2:
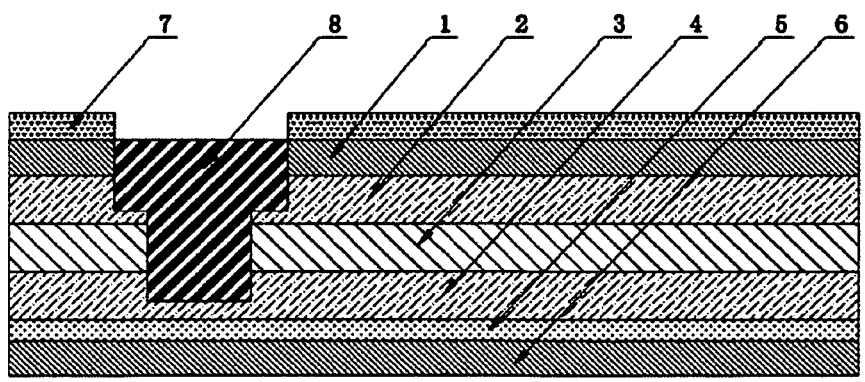
FIG. 2 is the structural schematic view of embodiment 2 of the present invention.

With reference to FIG. 2, a transaction card with 3D printing graphic surface has a card base, and said card base comprises in order from top to bottom: a front protective film layer 1, a front substrate layer 2, an intermediate INLAY layer 3, a back substrate layer 4, a back printing graphic layer 5, a back protective film layer 6, in particular: a concave cavity accommodating the IC module 8 is formed on said card base, and the upper surface of said front protective film layer 1 is adhered with a 3D printing graphic layer 7 with a height of 0.30 mm.

In the present embodiment, the VGD610UV-MVP 3D printer with six-color UV ink of white, transparent, C, M, Y, K ink is employed to print said 3D printing graphic layer.

Embodiment 3

Figure 3:
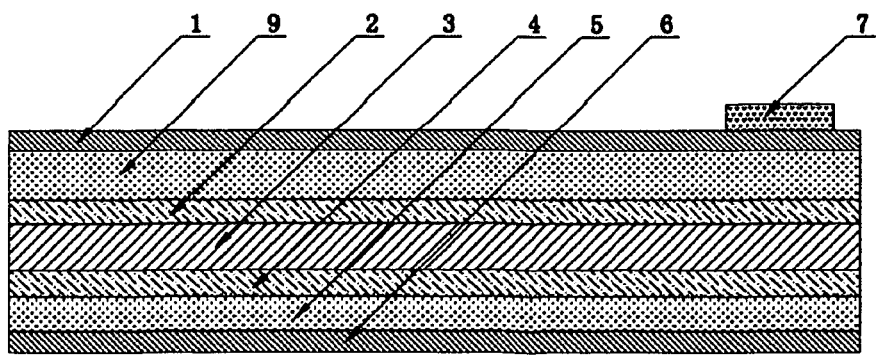
FIG. 3 is the structural schematic view of embodiment 3 of the present invention.

With reference to FIG. 3, a transaction card with 3D printing graphic surface has a card base, and said card base comprises in order from top to bottom: a front protective film layer 1, a front substrate layer 2, an intermediate INLAY layer 3, a back substrate layer 4, a back printing graphic layer 5, a back protective film layer 6, and there is a front printing graphic layer 9 on the front substrate layer 2, in particular: the upper surface of said front protective film layer 1 is adhered with a 3D printing graphic layer 7 located in the lower right corner on the front protective film layer. Said 3D printing graphic layer is with a height of 0.46 mm.

In the present embodiment, the VGD610UV-MVP 3D printer with six-color UV ink of white, transparent, C, M, Y, K ink is employed to print said 3D printing graphic layer.

Embodiment 4

Figure 4:
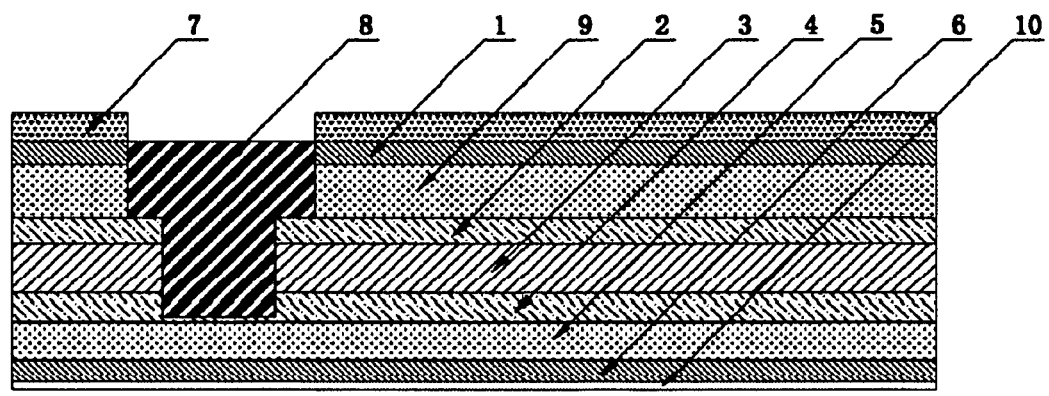
FIG. 4 is the structural schematic view of embodiment 4 of the present invention.

With reference to FIG. 4, a transaction card with 3D printing graphic surface has a card base, and said card base comprises in order from top to bottom: a front protective film layer 1, a front substrate layer 2, an intermediate INLAY layer 3, a back substrate layer 4, a back printing graphic layer 5, a back protective film layer 6, and there is a front printing graphic layer 9 on the front substrate layer 2, in particular: a concave cavity accommodating the IC module 8 is formed on said card base with the IC module 8 encapsulated within the concave cavity, and a magnetic strip 10 is adhered on the back protective film layer of said card base along the length direction, and the upper surface of said front protective film layer 1 is adhered with a 3D printing graphic layer 7 with a height of 0.05 mm.

In the present embodiment, the VGD610UV-MVP 3D printer with six-color UV ink of white, transparent, C, M, Y, K ink is employed to print said 3D printing graphic layer. The 3D printing graphic layer according to any embodiment of the invention may be in any 3D shape and/or may only cover the surface of the card partially.

Of course, the present invention is not limited to the several cards enumerated in the embodiments described above, and any modification can also be made within the scope claimed by the claims of the present invention, and the transaction cards produced by anyone according to the principle claimed by the present invention should be regarded as falling within the protection scope claimed by the claims of the present invention.

The invention claimed is:

1. A transaction card with 3D printing graphic surface, which card has a card base, and said card base comprises in order from top to bottom:
   a front protective film layer,
   a front substrate layer, an intermediate INLAY layer,
   a back substrate layer, a back printing graphic layer, a back protective film layer;
   wherein an upper surface of said front protective film layer is adhered with a 3D printing graphic layer with a height of 0.05-0.46 mm;
   wherein the 3D graphic on said 3D printing graphic layer is adhered at a partial area of the front protective film layer;
   wherein a concave cavity accommodating an IC module is formed in the front protective film layer, the front substrate layer, the intermediate INLAY layer, the back substrate layer and the 3D printing graphic layer of said card base, with the IC module encapsulated within the concave cavity below the 3D printing graphic card layer.

2. The transaction card with 3D printing graphic surface according to claim 1, wherein a magnetic stripe is adhered on the back protective film layer of said card base along the length direction.

3. The transaction card with 3D printing graphic surface according to claim 1, wherein a VGD610UV-MVP 3D printer with six-color UV ink of white, transparent, C, M, Y, K ink is employed to print said 3D printing graphic layer.

4. The transaction card with 3D printing graphic surface according to claim 1, wherein there is a front printing graphic layer on said substrate layer.

5. A transaction card with 3D printing graphic surface, which card has a card base, and said card base consisting of in order from top to bottom:
   a front protective film layer forming a plane upper surface,
   a front substrate layer, an intermediate INLAY layer,
   a back substrate layer, a back printing graphic layer, a back protective film layer;
   wherein an upper surface of said front protective film layer is adhered with a 3D printing graphic layer with a height of 0.05-0.46 mm, the 3D printing graphic layer being continuous and forming an uppermost surface of the card base; and
   wherein a concave cavity accommodating an IC module is formed in the front protective film layer, the front substrate layer, the intermediate INLAY layer, the back substrate layer and the 3D printing graphic layer of said card base, with the IC module encapsulated within the concave cavity below the 3D printing graphic card layer.

6. The transaction card with 3D printing graphic surface according to claim 5, wherein the 3D printing graphic layer covers the entire upper surface of the protective film layer.

7. A transaction card with 3D printing graphic surface, which card has a card base, and said card base comprises in order from top to bottom:
   a front protective film layer,
   a front substrate layer, an intermediate INLAY layer, a back substrate layer, a back printing graphic layer, a back protective film layer;

wherein a lower surface of said back protective film layer is adhered with a 3D printing graphic layer with a height of 0.05-0.46 mm;

wherein a magnetic strip is adhered on the back protective film layer of said card base along a length direction, and wherein a concave cavity accommodating an IC module is formed in the front protective film layer, the front substrate layer, the intermediate INLAY layer, the back substrate layer and the 3D printing graphic layer of said card base, with the IC module encapsulated within the concave cavity below the 3D printing graphic card layer.

* * * * *